(12) United States Patent
Sanchez et al.

(10) Patent No.: US 8,960,979 B2
(45) Date of Patent: Feb. 24, 2015

(54) OPTICAL DEVICE FOR A MOTOR VEHICLE INCLUDING A SURFACE LIGHT SOURCE

(75) Inventors: Vanesa Sanchez, Paris (FR); Vincent Godbillon, Paris (FR); Patrice Bos, Pantin (FR); Christophe Dubosc, Villemomble (FR); Luc Negre, Paris (FR)

(73) Assignee: Valeo Vision, Bobigny (FR)

( * ) Notice: Subject to any disclaimer, the term of this patent is extended or adjusted under 35 U.S.C. 154(b) by 82 days.

(21) Appl. No.: 13/575,070

(22) PCT Filed: Feb. 7, 2011

(86) PCT No.: PCT/EP2011/051763
§ 371 (c)(1),
(2), (4) Date: Oct. 12, 2012

(87) PCT Pub. No.: WO2011/098430
PCT Pub. Date: Aug. 18, 2011

(65) Prior Publication Data
US 2013/0027959 A1    Jan. 31, 2013

(30) Foreign Application Priority Data
Feb. 15, 2010    (FR) ..................... 10 51018

(51) Int. Cl.
| F21V 7/00 | (2006.01) |
| F21S 8/10 | (2006.01) |
| B60Q 3/02 | (2006.01) |
| F21Y 105/00 | (2006.01) |

(52) U.S. Cl.
CPC ............. *F21S 48/217* (2013.01); *B60Q 3/0283* (2013.01); *F21S 48/1163* (2013.01); *F21Y 2105/008* (2013.01)
USPC ...... 362/516; 362/543; 362/247; 362/249.02; 362/310; 362/296.09; 362/311.02; 362/346

(58) Field of Classification Search
USPC ................. 362/516, 517, 518, 543, 235, 247, 362/249.02, 296.02, 297, 310, 296.07, 362/296.09, 311.01, 311.02, 341, 346, 347
See application file for complete search history.

(56) References Cited

U.S. PATENT DOCUMENTS

| 4,975,814 | A  | 12/1990 | Schairer |
| 6,965,197 | B2 | 11/2005 | Tyan et al. |
| 7,019,334 | B2 | 3/2006  | Yatsuda et al. |
| 7,312,477 | B2 | 12/2007 | Yatsuda et al. |
| 7,513,642 | B2 | 4/2009  | Sormani |
| 7,622,748 | B2 | 11/2009 | Yatsuda et al. |
| 7,645,054 | B2 | 1/2010  | Goihl |
| 7,670,038 | B2 | 3/2010  | Schug et al. |
| 7,862,217 | B2 | 1/2011  | Suzuki et al. |
| 8,093,613 | B2 | 1/2012  | Yatsuda et al. |
| 8,186,854 | B2 | 5/2012  | Albou |
| 2004/0061136 | A1 | 4/2004 | Tyan et al. |

(Continued)

FOREIGN PATENT DOCUMENTS

| DE | 20207799 | 8/2002 |
| DE | 102007018985 | 10/2008 |

(Continued)

*Primary Examiner* — Ashok Patel
(74) *Attorney, Agent, or Firm* — Jacox, Meckstroth & Jenkins

(57) ABSTRACT

An optical device for a motor vehicle, comprising a first surface light source emitting light rays wherein it comprises a reflecting optical system deflecting the light rays emitted by the first surface light source.

19 Claims, 4 Drawing Sheets

(56) References Cited

U.S. PATENT DOCUMENTS

| | | |
|---|---|---|
| 2004/0251469 A1 | 12/2004 | Yatsuda et al. |
| 2005/0117347 A1 | 6/2005 | Melpignano et al. |
| 2005/0180153 A1 | 8/2005 | Albou |
| 2006/0071222 A1 | 4/2006 | Yatsuda et al. |
| 2006/0126353 A1* | 6/2006 | Ishida ............................ 362/543 |
| 2006/0215415 A1 | 9/2006 | Suzuki et al. |
| 2006/0285347 A1* | 12/2006 | Okada ........................... 362/516 |
| 2007/0211487 A1 | 9/2007 | Sormani |
| 2008/0068852 A1 | 3/2008 | Goihl |
| 2008/0117646 A1 | 5/2008 | Yatsuda et al. |
| 2008/0316760 A1 | 12/2008 | Schug et al. |
| 2009/0268455 A1* | 10/2009 | Allegri ........................... 362/235 |
| 2010/0073951 A1 | 3/2010 | Yatsuda et al. |
| 2010/0177525 A1* | 7/2010 | Iwasaki ......................... 362/517 |
| 2010/0309681 A1* | 12/2010 | Ohno ............................ 362/543 |
| 2011/0079722 A1 | 4/2011 | Gagnon |
| 2013/0027964 A1* | 1/2013 | Toyota et al. ................. 362/554 |

FOREIGN PATENT DOCUMENTS

| | | |
|---|---|---|
| DE | 102007018986 | 10/2008 |
| DE | 102007021865 | 11/2008 |
| EP | 1406474 | 4/2004 |
| EP | 1485959 | 12/2004 |
| EP | 1487025 | 12/2004 |
| EP | 1564481 | 8/2005 |
| EP | 1705422 | 9/2006 |
| EP | 1870633 | 12/2007 |
| FR | 2926677 | 7/2009 |
| WO | 03077325 | 9/2003 |
| WO | 2006033040 | 3/2006 |
| WO | 2006033042 | 3/2006 |

* cited by examiner

OPTICAL DEVICE FOR A MOTOR VEHICLE INCLUDING A SURFACE LIGHT SOURCE

CROSS-REFERENCE TO RELATED APPLICATIONS

This application claims priority to PCT Application PCT/EP2011/051763 filed Feb. 7, 2011, and also to French Application No. 1051018 filed Feb. 15, 2010, which applications are incorporated herein by reference and made a part hereof.

BACKGROUND OF THE INVENTION

1. Field of the Invention

The present invention relates to an optical device, in particular for a motor vehicle, such as a lighting and/or indicating device having in particular a photometric function that is useful when the vehicle is moving on the road, allowing the vehicle to be seen by other vehicles or allowing the driver of the vehicle to see outside.

2. Description of the Related Art

The use of surface light sources as light source of a motor vehicle optical device, in particular an organic light-emitting diode, also called an OLED, is known, in particular from document DE 10 2007 018 985, which document is incorporated herein by reference and made a part hereof. In the case of DE 10 2007 018 985, which is incorporated herein by reference and made a part hereof, the motor vehicle optical device is an indicating device for a motor vehicle. Although an extremely homogeneous light can be provided by an organic light-emitting diode type light source, it has a number of drawbacks:

First, organic light-emitting diodes today comprise small molecules, since they are the most efficient and more suited to producing an indicating function in a limited space, for example a vehicle rear wing. However, these molecules must be protected from water and oxygen molecules, and this is achieved using glass plates. Organic light-emitting diodes used to perform an indicating function therefore comprise a protective glass plate in contact with the emitting layer. The glass plates highly restrict the possible shapes of the organic light-emitting diodes. The organic light-emitting diodes must therefore have flat surfaces or at most ruled surfaces, and they must therefore not consist of a screen having any kind of warped surface such as the usual glass plate of an optical device for a motor vehicle. This therefore raises design issues.

Next, the luminance provided by an organic light-emitting diode of present-day technology is not sufficient to provide certain indicating functions (such as "city light", "stop lamp" and "center high mount stop lamp" indicating functions). An organic light-emitting diode of present-day technology typically provides a luminance of 1,000 Cd/m$^2$, while to fulfill the abovementioned functions, a luminance of 5,000 to 10,000 Cd/m$^2$ would be necessary. Nevertheless, a new technology of organic light-emitting diodes provides for markedly increasing the directivity of emission of the diode in the direction perpendicular to its emitting surface. Thus, without increasing the emittance of the diode, the luminance can be increased strongly, for example by a factor of 10, to reach about 10,000 Cd/m$^2$. However, an organic light-emitting diode of this technology is very directional. Consequently, it exhibits, in addition to the drawback mentioned previously, the drawback of having to be oriented in the longitudinal axis of the vehicle or more generally in the direction toward which it must emit light. This therefore raises design issues, in particular issues of size and design.

Consequently, the use of an organic light-emitting diode in a motor vehicle lighting and/or indicating device is viable only if this surface is a ruled surface. Hence, a lighting and/or indicating device can be produced by placing an organic light-emitting diode on a flexible substrate. The performance levels of such a technology are very low in comparison with technologies in which the diodes are placed on a flat glass substrate.

There is also known from document DE 10 2007 018 986, which is incorporated herein by reference and made a part hereof, a lighting device for a motor vehicle passenger compartment comprising:
  a group of organic light-emitting diodes on which are bonded a first optical component, and
  a second optical component.

There is also known from documents DE 202 07 799 and EP 1 485 959, which are equivalent to U.S. Patent Publication 2005/0117347, which documents are incorporated herein by reference and made a part hereof, motor vehicle indicating devices comprising an organic light-emitting diode covered by an optical component comprising a spatial repetition of a pattern with the aim of improving the performance of the diode by virtue of the fact that the rays are less easily trapped by total reflection and can thus more easily exit the transparent substrate. This technology makes sense only if the optical component is bonded to the substrate, or in other words if the optical component is bonded to a plane. Such indicating devices do not provide for solving the problems mentioned earlier.

There is also known from document FR 2 926 677, which is equivalent to U.S. Patent Publication 2011/0079722, which documents are incorporated herein by reference and made a part hereof, an organic light-emitting diode device emitting a light beam exhibiting high directivity. Such an organic light-emitting diode comprises, between these two electrodes, various layers, in particular a light-emitting layer, a layer encouraging the transport of electrons up to the emitting layer and a layer encouraging the transport of holes up to the emitting layer. All these layers form a microcavity, the thickness of which is adjusted to create an optical resonance. The result of such a structure is an emission of a light beam exhibiting high directivity.

What is needed, therefore, is an optical device that overcomes one or more of the above-mentioned problems in the prior art.

SUMMARY OF THE INVENTION

The aim of the invention is to provide a motor vehicle optical device, in particular a lighting and/or indicating device that is simple and compatible with the numerous size and design constraints to which these devices are subject.

An object of the invention is a motor vehicle optical device, in particular a lighting and/or indicating device for a motor vehicle, comprising a first surface light source emitting light rays. The motor vehicle optical device according to the invention comprises a reflecting optical system deflecting the light rays emitted by the first surface light source. Thus, it is possible to become free of position constraints for the first light source. According to one embodiment, the optical device comprises a casing containing the surface source and the reflecting optical system. This casing is closed by a cover lens through which the rays reflected by the reflecting optical system exit.

Preferably, the optical system exhibits means, in particular patterns, for overcoming the risks of dazzling drivers of vehicles when sun's rays reflect off the light source, in particular when the latter is an organic light-emitting diode. Specifically, the sun's rays, after having been reflected off the optical system, off the organic light-emitting diodes and off the optical system again, are thus sent in all directions and the risk of dazzling is practically nil.

In particular, the first surface light source can emit light rays in a first direction and the reflecting optical system can deflect the light rays emitted in the first direction, into a second direction that is different from the first direction. Thus, the first light source is not necessarily oriented in the direction in which the optical device must emit the light.

The reflecting optical system can be formed by one or more parts. Thus, it is possible to produce an optical device having a small size.

The device can comprise a second surface light source. Because of this, it is possible to increase the luminance of the device and/or provide several functions requiring light of several colors and/or meet size constraints of the optical device.

Preferably, at least a part of the reflecting optical system forms part of a second surface light source. Thus, it is possible to limit the number of components forming the optical device. In particular, the reflecting optical system can be, at least in part, an electrode of an organic light-emitting diode. The organic light-emitting diode can be placed adjacent to a reflecting surface of a mirror. In this case, the reflecting optical system comprises both the reflecting part of the second surface light source and the mirror. It is also possible to produce a reflecting system without an associated mirror, in which the reflecting optical system forms part of the second surface light source, i.e. this reflecting system is produced by at least a part of a second surface light source.

The reflecting optical system can exhibit a geometry providing a spreading of the light beams emitted by the first surface source. This provides for obtaining a desired light distribution of the emitted light rays and for obtaining a particular appearance of the lighting and/or indicating device.

Preferably, the first surface light source is an organic light-emitting diode. Indeed, this technology is now widespread and its cost is decreasing.

The first surface source can be transparent. Thus, the light emitted by the second surface source can exit the optical device after having passed through the first surface source. Thus, according to embodiments in which the first surface source is positioned in front of the reflecting optical system, a part of the reflected rays which will meet the first surface source will pass through it. This provides for a decrease in loss of luminous power.

The area of emission of the surface light source can be greater than 1 cm². To improve the visibility of the function, this surface area can be greater than 10 cm².

Preferably, the first light source exhibits a high directivity of emission in the direction perpendicular to its emitting surface, as compared with Lambertian light-emitting diodes. Thus, without increasing the emittance of the light source, the luminance in a given direction can be increased markedly, for example by a factor of 5 to 10, around the direction perpendicular to the surface. Advantageously, the first light source has a luminance of at least 5,000 Cd/m² and, preferably, at least 10,000 Cd/m². There exist today organic light-emitting diodes that include means conferring to them this directivity and this luminance. For example, it is possible to use organic light-emitting diodes such as those described in patent FR2926677, which is equivalent to U.S. Patent Publication 2011/0079722, which documents are incorporated herein by reference and made a part hereof. For example, the high directivity of the surface light source is characterized in that the light intensity law for this source as a function of the emission angle, θ, is a law of the type:

$$\cos(\theta)^n;$$

where n is a power varying between 10 and 20.

The expression "of the type: $\cos(\theta)^n$" is understood to mean a function of the angle of emission θ, changing in the same way as the function $\cos(\theta)^n$.

According to one embodiment, the optical device is a device for producing an indicating function such as a position indicating function of the vehicle, a direction change indicating function, a reversing indicating function, a braking indication, and a position indicating function in the event of fog.

According to one embodiment, the motor vehicle optical device according to the invention is used, for example, to provide a road lighting function, such as a high beam function, a low beam function and a fog beam function.

According to one embodiment, the motor vehicle optical device according to the invention is used, for example, to provide a passenger compartment lighting function.

According to one variant of the invention, the motor vehicle optical device according to the invention is arranged to produce an interior decoration light in the passenger compartment of the vehicle.

The first surface source can comprise several surface elements emitting light, in particular several organic light-emitting diodes. Thus, it is possible to follow more closely the curve of a cover lens of an optical device.

The surface light source preferably includes an organic light-emitting diode (OLED). As a variant, the surface light source can include a light source, for example a lamp or an LED (i.e. a light-emitting diode equipped with a photoemissive component of small dimensions) associated with an optical diffuser, this light source being placed behind the optical diffuser arranged to diffuse the light from this lamp or this LED.

Another object of the invention is a motor vehicle comprising an optical device defined previously.

These and other objects and advantages of the invention will be apparent from the following description, the accompanying drawings and the appended claims.

BRIEF DESCRIPTION OF THE ACCOMPANYING DRAWINGS

The accompanying drawings represent, by way of examples, various embodiments of an optical device according to the invention.

DETAILED DESCRIPTION OF THE PREFERRED EMBODIMENTS

The principle of the invention is to use, in an optical device for a motor vehicle, a surface light source, for example an organic light-emitting diode exhibiting in particular a high directivity and a high luminance perpendicularly to its surface, and to combine it with a reflecting optical system placed at a distance from the source. The reflecting optical system exhibits the function of deflecting, in an overall manner, the light rays emitted by the light-emitting diode, thereby providing for positioning the diode in a position that is not necessarily perpendicular to the desired direction of the light rays that are useful for the optical device. Preferably, it also exhibits the function of spreading the light rays.

Thus, a ray coming from the surface light source and oriented perpendicularly to the surface of this source is deflected by the reflecting optical system in order to be directed to the outside of the optical device in a chosen direction, for example parallel to the longitudinal axis of the motor vehicle.

The principle of an optical device 1 for a motor vehicle is also described hereinafter with reference to FIG. 1. The optical device is used, for example, to provide one of the following functions: high beam lighting, low beam lighting, fog beam lighting, vehicle position indication, direction change indication, reversing indication, braking indication, indication in the event of fog.

Figure 1:
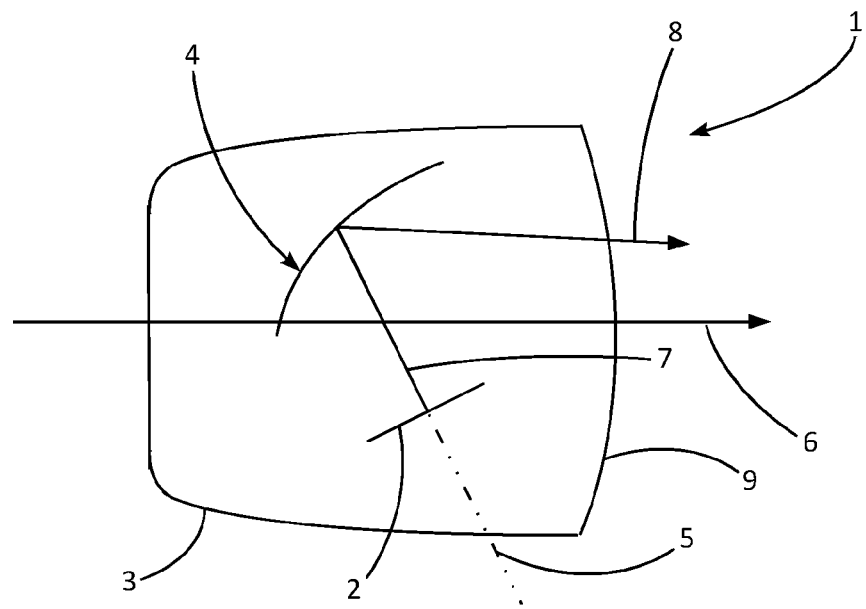
FIG. 1 is a block diagram of a first embodiment of a motor vehicle optical device according to the invention.

FIG. 1 illustrates a lighting and/or indicating device. As seen previously this is not limiting, the motor vehicle optical device according to the invention able to also be, for example, a passenger compartment interior device. The lighting and/or indicating device comprises mainly:

a closed enclosure, formed by a casing 3 and a cover lens 9,
a first surface light source 2, and
a reflecting optical system 4.

The reflecting optical system 4 is positioned, at least locally, at a distance from the first surface light source 2.

When the first surface light source 2 is active, it emits a beam of rays 7 mainly in a first direction 5, for example perpendicular to the surface of the first surface light source 2. This beam of rays 7 is deflected and, possibly shaped by the reflecting optical system 4. The rays 8 thus obtained exit the optical device 1 through the cover lens 9 and thus provide the optical function. Preferably, the rays 7 exiting the optical device 1 are, overall, parallel to a second direction 6 chosen according to the optical function provided. According to the optical function provided, the beam formed by the rays 8 can exhibit a spreading that is more or less pronounced, i.e. these rays 8 are included in a cone having an axis parallel to the second direction 6, and having an angle at the apex that is more or less pronounced, this angle corresponding to the spread. Moreover, this cone is not necessarily a cone of revolution. Indeed, for a number of optical functions, it is favorable for the cross-section of this cone perpendicular to the second direction 6 to exhibit a height that is less than its width.

Preferably, the reflecting optical system 4 extends over the whole surface facing the first surface light source 2 relative to the main direction of emission of light from the first surface light source 2. Thus, each light ray or at least most of the light rays emitted by the first surface light source 2 in the main direction of emission are deflected by the reflecting optical system 4 such that they exit the optical device 1 while being included in cones identical to that mentioned previously.

For example, the reflecting optical system 4 can consist of a simple mirror, for example a flat mirror or mirror having a warped shape. Preferably, the geometry of the mirror is used to direct, in an overall sense, the rays emitted by the first surface light source 2 into the second direction 6 required by the lighting and/or indicating function. Preferably again, the geometry of the mirror is also used to produce a spreading of the light beams as mentioned previously.

The reflecting optical system 4 can exhibit reflecting elementary patterns. These reflecting elementary patterns can be flat. Thus, the elementary light beams received by the elementary patterns from the first surface light source 2 are reflected without being spread. Nevertheless, the reflecting elementary patterns can also be convex. Thus, the elementary light beams received by the elementary patterns from the first surface light source 2 are reflected while being spread.

For example, the first direction 5 and the second direction 6 can form an angle of at least 10°.

In particular, the first surface light source can be positioned horizontally. It can also exhibit an edge following the curve of the cover lens of the optical device 1.

In one variant, the first surface light source 2 can be of the type emitting light on each of its faces: it can be an organic light-emitting diode having two transparent electrodes. In that case, the optical device 1 can have a reflecting optical system 4 for reflecting the light rays emitted by each of the faces of the first surface light source 2.

Figure 2:
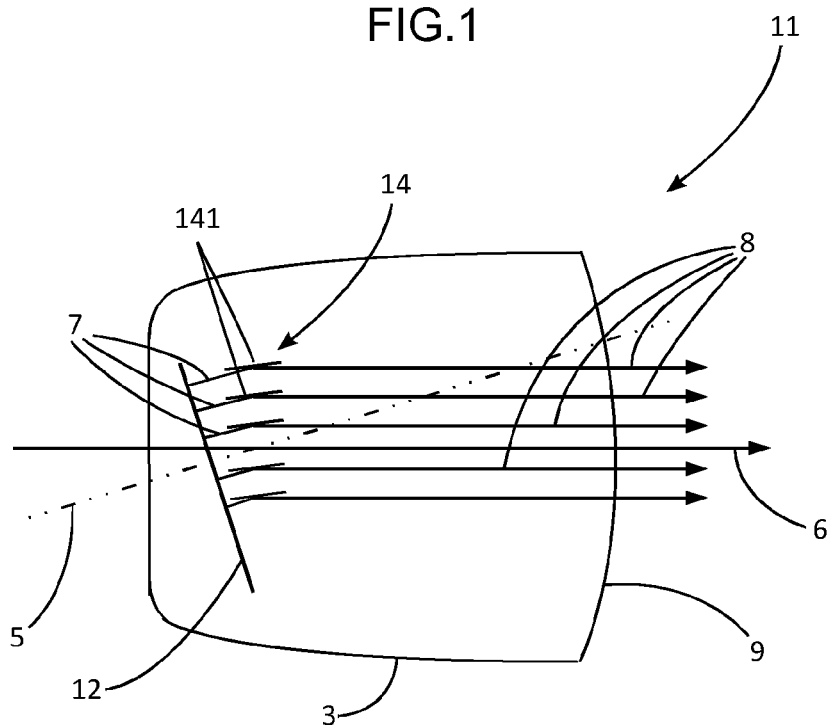
FIG. 2 is a block diagram of a second embodiment of a motor vehicle optical device according to the invention.

A second embodiment of the optical device 11 represented in FIG. 2, differs from the first embodiment of FIG. 1 mainly in that the reflecting optical system 14 is implemented as several elements 141, these elements 141 being illuminated by the first surface light source 12. By virtue of such a composition, it is possible to use a surface source of large dimensions without the reflecting optical system 14 exhibiting large dimensions.

The various elements 141 can, for example, be positioned parallel with each other and/or at the same distance from one another.

Preferably, the various elements 141 may be arranged in the form of horizontal or substantially horizontal strips between the first surface light source 12 and the cover lens. Specifically, such an arrangement provides for limiting the undesirable effects of reflection of the sun's rays on the first surface light source 12. Furthermore, such an arrangement produces an aesthetic effect.

The various elements 141 can interact with each other, i.e. a light ray reflected by one of the elements 141 can be reflected by another of the elements 141.

Figure 3:
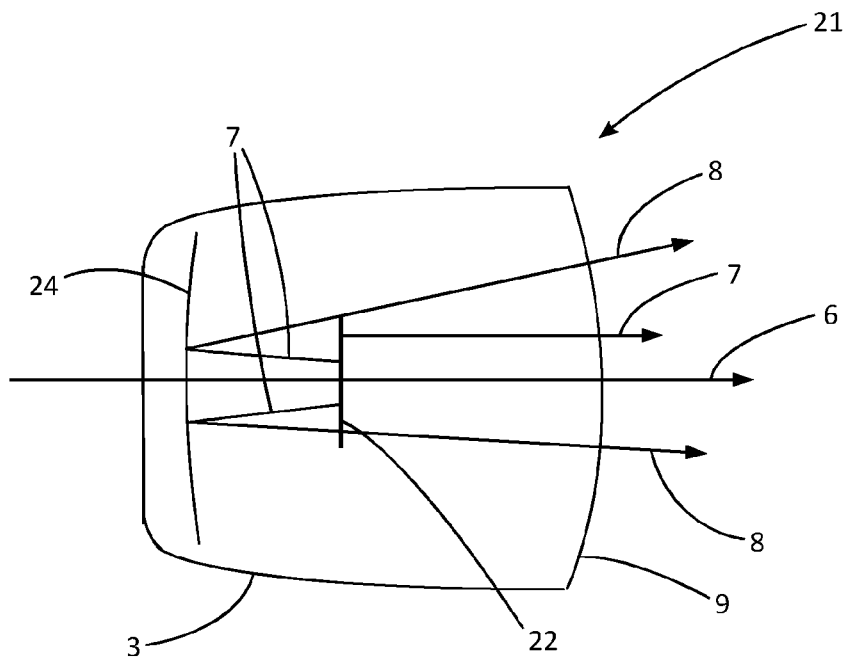
FIG. 3 is a block diagram of a third embodiment of a motor vehicle optical device according to the invention.

A third embodiment of the optical device 21 represented in FIG. 3 differs from the first embodiment of FIG. 1 mainly in that the first surface light source 22 is of the transparent type and in that it is positioned in front of the reflecting optical system 24 relative to the second direction 6. Thus, the first surface light source 22 emits light rays 7 from each of its faces. With such a configuration, light rays 7 emitted by one face of the first surface light source 22 exit the optical device 21 without being deflected by the reflecting optical system 24, while the light rays 8 emitted by the other face of the first surface light source 22 exit the optical device 21 after having been deflected by the reflecting optical system 24. Among the reflected rays 8, some reach the cover lens 9 directly after reflection off the reflecting optical system 24, and others reach the cover lens 9 after having passed through the first surface light source 22. It is to be noted that a part of the light rays 8 is absorbed when passing through the first surface light source 22.

In the configuration represented, the area of the reflecting optical system 24 is greater than the area of the first surface light source 22. Nevertheless, the converse can be envisaged.

Figure 4:
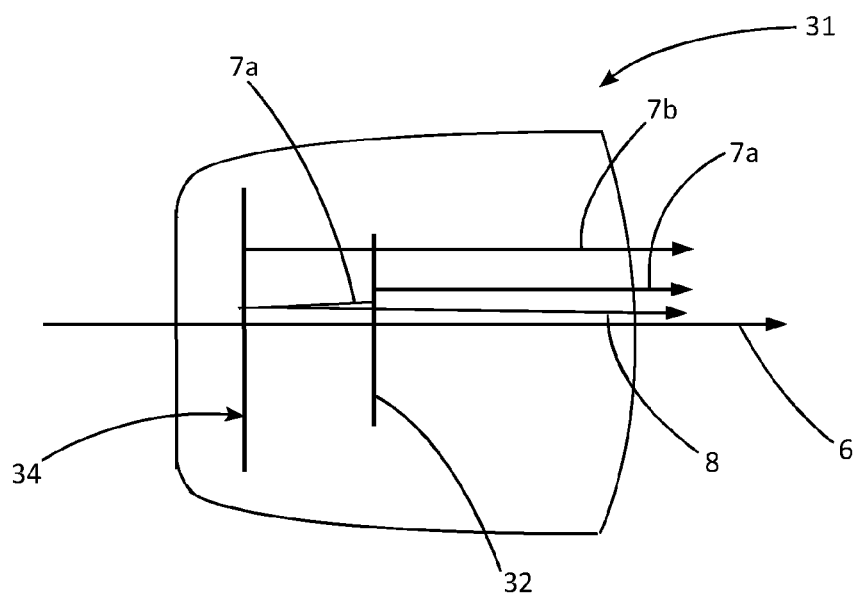
FIG. 4 is a block diagram of a fourth embodiment of a motor vehicle optical device according to the invention.

A fourth embodiment of the optical device 31 represented in FIG. 4 differs from the third embodiment of FIG. 3 mainly in that the reflecting optical system 34 forms part of a second surface light source. Preferably, the reflecting optical system 34 forms part of an organic light-emitting diode. In particular, the reflecting optical system 34 is an electrode of the organic light-emitting diode.

The second surface light source can consist of only one organic light-emitting diode or a group of several organic light-emitting diodes approximating a warped surface or one organic light-emitting diode having a warped surface.

In this embodiment, in addition to the first surface light source 32, for which the path of the light rays is described with the previous embodiment, the second surface light source 34 emits light rays. At least some of those reach the cover lens of the optical device after having passed through the first surface light source 32. As a variant, this second surface light source 34 can be arranged in such a way that, although the second surface light source 34 reflects rays emitted rearward by the first surface light source 32, the rays emitted by this second surface light source 34 reach the lens without passing through the first surface light source 32.

For example, the first surface light source 32 and the second surface light source 34 can emit radiation of different wavelengths and therefore different colors.

The first and second surface light sources 32, 34 can be activated simultaneously or independently of one another. In particular, activating the first surface light source 32 can enable provision of a first function, activating the second surface light source 34 can enable provision of a second function and simultaneous activation of both surface light sources 32, 34 can enable provision of a third function.

The second surface light source 34 can be Lambertian.

Figure 5:
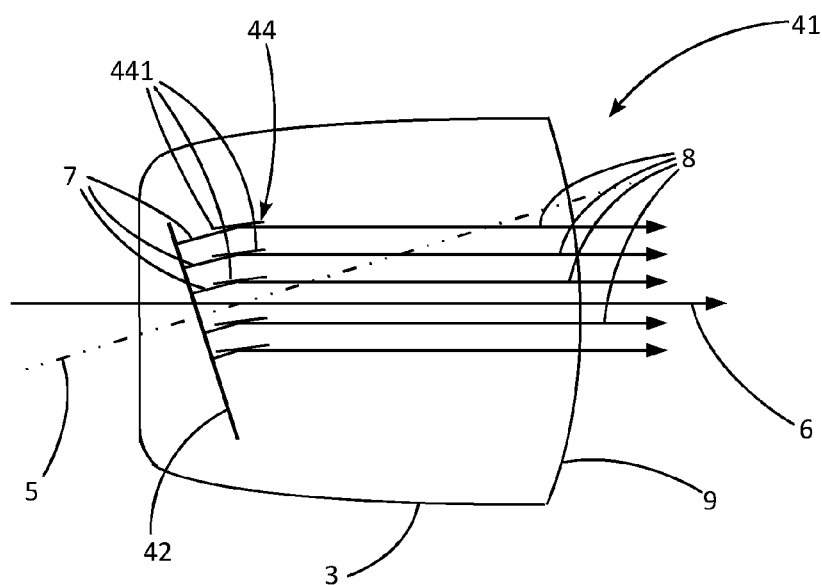
FIG. 5 is a block diagram of a fifth embodiment of a motor vehicle optical device according to the invention.

A fifth embodiment of the optical device 41 represented in FIG. 5 differs from the second embodiment represented in FIG. 2 in that the reflecting optical system 44 is implemented as several elements 441, these elements 441 being second surface light sources and being illuminated by the first surface light source. By virtue of such a composition, it is possible to use a surface source of large dimensions without the reflecting optical system 44 exhibiting large dimensions.

Preferably, the various elements 441 are organic light-emitting diodes. They can be of the transparent type, i.e. with emission of light on each face or of the non-transparent type, i.e. with emission of light on only one face.

The various elements 441 can interact with each other, i.e. a light ray emitted or reflected by one of the elements can be reflected by another of the elements.

The second surface light sources can be Lambertian.

The section planes of the various diagrams of FIGS. 1 to 5 can just as well be vertical as horizontal. They can even be inclined.

In another embodiment, not represented, the optical device comprises two or more surface light sources. These two sources can be placed side-by-side. They can emit light mainly in two different directions. An optical system provides for deflecting and shaping the beams of light rays emitted by the various sources. The beams of light rays thus obtained can be, in an overall manner, oriented in the same direction. Alternatively, the light beams coming from the first source 21 can be deflected, in an overall manner, into a first direction and the light beams from the second source 22 can be deflected, in an overall manner, into a second direction, these first and second directions being different.

The part of the reflecting optical system facing the first light source may exhibit different optical characteristics from the part of the optical system facing the second light source. Preferably, in such a case, variations in characteristics may be gradual in order to avoid any abrupt variation in appearance of the optical device. The light sources may or may not be arranged joined together, orienting their emission plane differently. The reflecting optical system provides for conferring the desired overall direction to the beam coming from each independent source. It is thus possible to overcome orientation constraints of surface sources. Thus, surface sources can be arranged according to the design of the optical device, for example to follow its curve. The optical system will then be suitable for conferring the overall direction and desired spread of the light beams. Such an embodiment also provides for an off appearance that is different from the on appearance, the surface of the surface source, for example the organic light-emitting diode, not being perceived in the same way according to whether it is on or off, especially when it emits in a highly directional manner. The latter embodiment can of course be combined with the other embodiments described previously.

Advantageously, the first and second light sources emit light of different colors and can be activated independently of one another. Thus, the optical device can provide several functions, in particular several functions requiring different colors, the optical device exhibiting nevertheless a homogeneous appearance from outside the cover lens when the light sources are off. For example, the device can provide both a rear position indicating function and a direction change indicating function.

Figure 6:
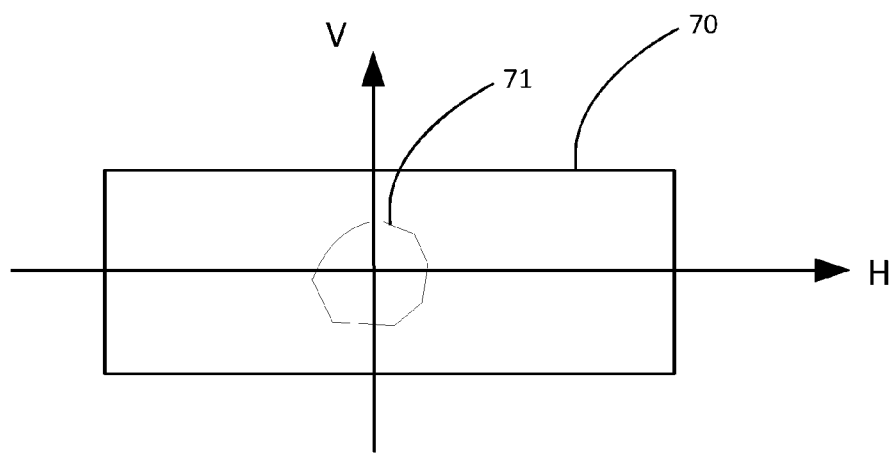
FIG. 6 is a graph representing a spread pattern of a light beam obtained by a first spreading method.

As explained previously, in several motor vehicle lighting applications, it is favorable to spread the light rays. In particular, it is often beneficial to have a greater spreading of the light rays in a horizontal axis than in a vertical axis. The reflecting optical system can be arranged and designed to allow a spreading of the light, around the main direction of the light beam. The light beam hence corresponds to a group of rays contained in a cone, the axis of which represents the direction of emission. The width of the cone corresponds to the spread. An example beam is represented in FIG. 6. This example beam is represented schematically in rectangular form 70; nevertheless the beam can exhibit any other shape. This FIG. 6 corresponds to a screen onto which the light beam from the optical device is projected. This screen is in principle vertical, the axis V corresponding to the axis of the vertical direction and the axis H to the horizon. In FIG. 6, there is illustrated the cross-section of the light beam 71, as it would be without an arrangement to cause a spreading of the light beam 71. The light beam 71 would be much more concentrated. By virtue of various embodiments of reflecting optical systems in designing the reflecting optical system to deflect a part of the rays on either side of the main direction of emission of the light, the spread beam 70 is obtained at a determined distance, for example 10 meters or 25 meters, from the optical device. In these embodiments, each light beam 71, as elementary as it may be, in particular each light beam 71 impacting the whole of an elementary pattern of the reflecting optical system, is spread.

Figure 7:
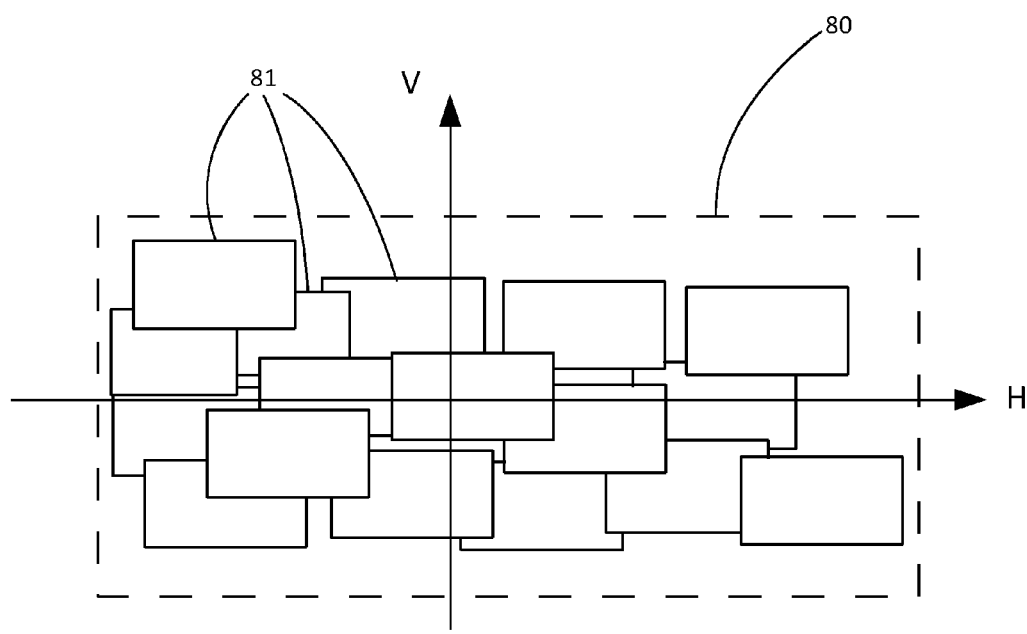
FIG. 7 is a graph representing a spread pattern of a light beam obtained by a second spreading method.

In other embodiments of the optical device, the same spreading effect is obtained differently as represented in FIG. 7. Specifically, there is no spreading of each elementary beam. The spreading function is obtained by deflections of elementary beams into various directions around the second direction 6. Means for spreading light rays are formed by a group of deflecting means. An example diffusion pattern or spread pattern is represented in FIG. 7. This example pattern is represented schematically in rectangular form 80, nevertheless the pattern can exhibit any other shape. In this embodiment, an elementary light beam, in particular a light beam impacting the whole of an elementary pattern of the reflecting optical system, is not spread. Thus, there is obtained, from a light beam impacting a group of elementary patterns of a diopter of the optical system, a set of light beams (the cross-sections 81 of which are represented in FIG. 7) coming from the elementary patterns and oriented in various directions. The incomplete overlapping and offsetting of the various light spots in a distributed manner over the whole of the spread area of the beam 80, provides for generating the overall beam.

Alternatively, it is possible to use in a complementary manner the two principles described above. Specifically, it is possible to provide the spreading function by virtue of the combined effect of elementary patterns having a spreading function and being arranged so as not to fully emit the light in the same direction.

Figure 8:
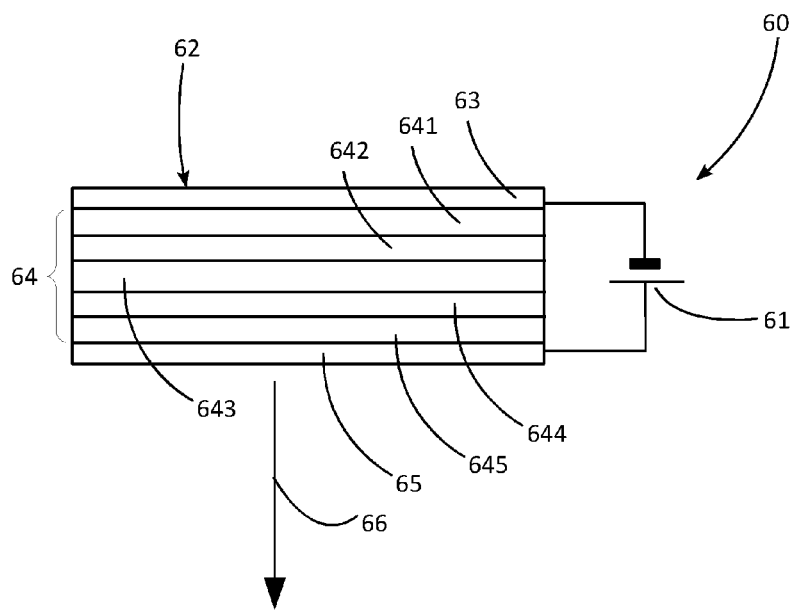
FIG. 8 is a diagram in cross-section of an organic light-emitting diode.

The surface light source or sources can be of all types. Nevertheless, light sources of the organic light-emitting diode type are preferred. Such an organic light-emitting diode device 60 is represented in FIG. 8. The light-emitting diode device 60 comprises an organic light-emitting diode 62 and an electrical voltage generator 61. The organic light-emitting diode 62 comprises several layers: a cathode 63, an anode 65 and an organic layer 64. When the organic layer 64 is subjected to an electrical voltage, it emits light radiation 66 propagating through the anode 65 which is transparent in respect of this radiation 66. The organic layer 64 can if necessary comprise various strata 641 to 645 made of various organic materials. Preferably, organic light-emitting diodes 62 comprising additional strata are used. In addition to the light-emitting stratum 643, the organic layer 64 comprises a stratum 641 encouraging the transport of electrons up to the emitting stratum 643 and a stratum 645 encouraging the transport of holes, i.e. absences of electrons, up to the emitting stratum 643. The organic layer 64 can also comprise a stratum 642 blocking the holes from the lower strata, 643 to 645, and a stratum 644 blocking the electrons from the upper strata 641 to 643. All these strata form a microcavity, the thickness of which is adjusted to create an optical resonance. Thus, selective interferential reflectors are produced which form resonant cavities. For example, an organic light-emitting diode of the type described in document FR 2 926 677, which is equivalent to U.S. Patent Publication 2011/0079772, which is incorporated herein by reference and made a part hereof, mentioned earlier can be used.

Preferably, the emitting area of the surface light sources is greater than 1 cm², or even, greater than 10 cm².

Preferably, in the embodiments described previously, the elementary patterns provided on the reflecting optical system are typically of sizes between 0.5 mm and 1 mm, or even between 0.2 mm and 5 mm, or even up to 10 mm. Thus, they can be produced by virtue of molds obtained using conventional manufacturing means.

It is understood that, by virtue of the optical device according to the invention, the surface light source can be flat and need not necessarily be oriented in the direction in which the light rays are supposed to propagate outside the device. Thus, installation of a surface light source in an optical device is simplified. It is thus possible to use high luminance organic light-emitting diodes without necessarily being subjected to their prohibitive positioning constraints. Moreover, the spreading effect of the optical system provides for solving problems of reflection that the presence of a light-emitting diode without an optical system posed.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An optical device for a motor vehicle, comprising:
    a housing;
    a first surface light source mounted in said housing, said first surface light source being an organic light-emitting diode and having a first surface that emits first light rays in a first direction and a second surface that emits second light rays in a second direction that is not the same as said first direction:
    a reflecting optical system deflecting said first light rays emitted by said first surface of said first surface light source;
    wherein said first surface emits said first light rays in said first direction generally toward said reflecting optical system and said reflecting optical system reflects at least most of said first light rays received from said first surface towards and through a lens of the optical device while said second light rays from said second surface are emitted in said second direction towards said lens and the are not reflected b said reflecting optical system;
    wherein said reflecting optical system is formed by one or more parts;
    wherein at least a part of said reflecting optical system forms part of a second surface light source.

2. The optical device as claimed in claim 1, wherein said first surface light source emits said first light rays in said first direction and in that said reflecting optical system deflects said first light rays emitted in said first direction into said second direction that is different from said first direction.

3. The optical device as claimed in claim 1, wherein said optical device is at least one of an indicator or a lighting device.

4. The optical device as claimed in claim 1, wherein said optical device comprises said second surface light source.

5. The optical device as claimed in claim 1, wherein at least a part of said reflecting optical system forms part of said second surface light source.

6. The optical device as claimed in claim 1, wherein said reflecting optical system is an electrode of said organic light-emitting diode.

7. The optical device as claimed in claim 1, wherein said reflecting optical system exhibits a geometry providing a spreading of said first light rays emitted by said first surface light source.

8. The optical device as claimed in claim 1, wherein said first surface light source comprises a plurality of organic light-emitting diodes that emit light.

9. The optical device as claimed in claim 1, wherein said first surface light source is transparent.

10. The optical device as claimed in claim 1, wherein an area of emission of said first surface light source is greater than 1 cm².

11. The optical device as claimed in claim 10, wherein said area of emission of said first surface light source is greater than 10 cm².

12. The optical device as claimed in claim 1, wherein said first surface light source exhibits a high directivity of emission in a direction perpendicular to its emitting surface.

13. The optical device as claimed in claim 1, wherein said first surface light source has a luminance of at least 5,000 Cd/m².

14. The optical device as claimed in claim 1, wherein said optical device is an indicating lamp.

15. The optical device as claimed in claim 2, wherein said reflecting optical system is formed by one or more parts.

16. The optical device as claimed in claim 2, wherein said optical device comprises said second surface light source.

17. The optical device as claimed in claim 2, wherein at least a part of said reflecting optical system forms part of said second surface light source.

18. The optical device as claimed in claim 2, wherein an area of emission of said first surface light source is greater than 1 cm$^2$.

19. The optical device as claimed in claim 2, wherein said first surface light source has a luminance of at least 5,000 Cd/m$^2$.

\* \* \* \* \*

UNITED STATES PATENT AND TRADEMARK OFFICE
CERTIFICATE OF CORRECTION

PATENT NO. : 8,960,979 B2
APPLICATION NO. : 13/575070
DATED : February 24, 2015
INVENTOR(S) : Sanchez et al.

It is certified that error appears in the above-identified patent and that said Letters Patent is hereby corrected as shown below:

In the Claims

Claim 1, Column 10, line 24, please delete "the" and insert --they-- therefor;

Claim 1, Column 10, line 24, please delete "b" and insert --by-- therefor.

Signed and Sealed this
Fourth Day of August, 2015

Michelle K. Lee
*Director of the United States Patent and Trademark Office*